US009051964B2

(12) United States Patent
Yamashita et al.

(10) Patent No.: US 9,051,964 B2
(45) Date of Patent: Jun. 9, 2015

(54) TAPERED ROLLER BEARING APPARATUS AND HUB UNIT

(75) Inventors: Kiichiro Yamashita, Kashiwara (JP); Masao Takimoto, Kashiwara (JP); Youichi Tsuzaki, Kashiba (JP)

(73) Assignee: JTEKT Corporation, Osaka-Shi, Osaka (JP)

(*) Notice: Subject to any disclaimer, the term of this patent is extended or adjusted under 35 U.S.C. 154(b) by 1930 days.

(21) Appl. No.: 12/076,233

(22) Filed: Mar. 14, 2008

(65) Prior Publication Data

US 2009/0252445 A1   Oct. 8, 2009

(30) Foreign Application Priority Data

Mar. 15, 2007   (JP) ................................. 2007-066467

(51) Int. Cl.
| | |
|---|---|
| F16C 33/58 | (2006.01) |
| F16C 19/28 | (2006.01) |
| F16C 33/76 | (2006.01) |
| F16C 19/38 | (2006.01) |
| B60B 27/00 | (2006.01) |
| F16C 19/22 | (2006.01) |
| F16C 33/64 | (2006.01) |
| F16C 33/78 | (2006.01) |

(52) U.S. Cl.
CPC ............. *F16C 19/386* (2013.01); *B60B 27/001* (2013.01); *F16C 19/225* (2013.01); *F16C 33/64* (2013.01); *F16C 33/7886* (2013.01); *F16C 2326/02* (2013.01); *F16C 33/585* (2013.01)

(58) Field of Classification Search
USPC ......... 384/484, 486, 544, 571, 589, 625, 564; 29/898.061, 898.07, 898.09
See application file for complete search history.

(56) References Cited

U.S. PATENT DOCUMENTS

| 3,588,747 | A | | 6/1971 | Rusho | |
|---|---|---|---|---|---|
| 4,333,695 | A | * | 6/1982 | Evans | ........................... 384/571 |
| 6,135,643 | A | * | 10/2000 | Hattori et al. | ................. 384/589 |

(Continued)

FOREIGN PATENT DOCUMENTS

| JP | 60-121293 | | 8/1985 |
|---|---|---|---|
| JP | 2000-002251 | A | 1/2000 |

(Continued)

OTHER PUBLICATIONS

Japanese Office action issued on May 31, 2011 with an English translation thereof.

*Primary Examiner* — Marcus Charles
(74) *Attorney, Agent, or Firm* — McGinn IP Law Group, PLLC (57) ABSTRACT

A tapered roller bearing apparatus includes: an outer ring that includes an outer-ring raceway formed in an inner circumferential surface thereof; an inner ring which includes a large-diameter portion having a cylindrical portion with a substantially uniform outer diameter, a large rib portion having an outer circumferential surface and a guide surface continued to the outer circumferential surface, an inner-ring raceway, and a small-diameter cylindrical portion which are sequentially formed from one end to the other end, and are subjected to a heat treatment to have a surface-hardened layer; and a plurality of tapered rollers which are rollably disposed between the inner-ring raceway and the outer-ring raceway, a large-diameter end surface of the tapered roller being guided by the guide surface. An angle formed between the guide surface and the outer circumferential surface is obtuse.

9 Claims, 6 Drawing Sheets

(56) References Cited

U.S. PATENT DOCUMENTS

| | | |
|---|---|---|
| 6,280,093 B1 | 8/2001 | Ohtsuki et al. |
| 6,644,861 B2 * | 11/2003 | Hacker et al. ............... 384/589 |
| 6,659,650 B2 * | 12/2003 | Joki et al. .................... 384/589 |
| 6,857,786 B2 * | 2/2005 | Csik ............................ 384/589 |
| 7,108,427 B2 * | 9/2006 | Joki et al. .................... 384/484 |
| 7,641,394 B2 * | 1/2010 | Komori et al. ............... 384/544 |
| 2002/0085781 A1 * | 7/2002 | Ohkuma et al. ............. 384/544 |
| 2005/0126005 A1 * | 6/2005 | Yasumura et al. ....... 29/898.061 |
| 2006/0179656 A1 * | 8/2006 | Seo ......................... 29/898.061 |
| 2007/0147718 A1 * | 6/2007 | Takimoto .................... 384/486 |
| 2007/0193032 A1 * | 8/2007 | Takimoto .................. 29/898.04 |

FOREIGN PATENT DOCUMENTS

| | | |
|---|---|---|
| JP | 2004-150482 A | 5/2004 |
| JP | 2005-3111 | 1/2005 |
| JP | 2006-029520 A | 2/2006 |
| JP | 2007-009951 A | 1/2007 |

\* cited by examiner

RELATED ART

TAPERED ROLLER BEARING APPARATUS AND HUB UNIT

BACKGROUND OF THE INVENTION

The present invention relates to a tapered roller bearing apparatus and a hub unit.

A vehicle wheel is rotatably supported by a rolling bearing with respect to a suspension device. Heavy vehicles such as truck and bus are generally supported by double row tapered roller bearing with respect to the suspension device.

As to the bearing apparatus, there has been proposed a tapered roller bearing apparatus called a third generation hub unit that is designed to reduce a cost by reducing the number of components.

Figure 6:
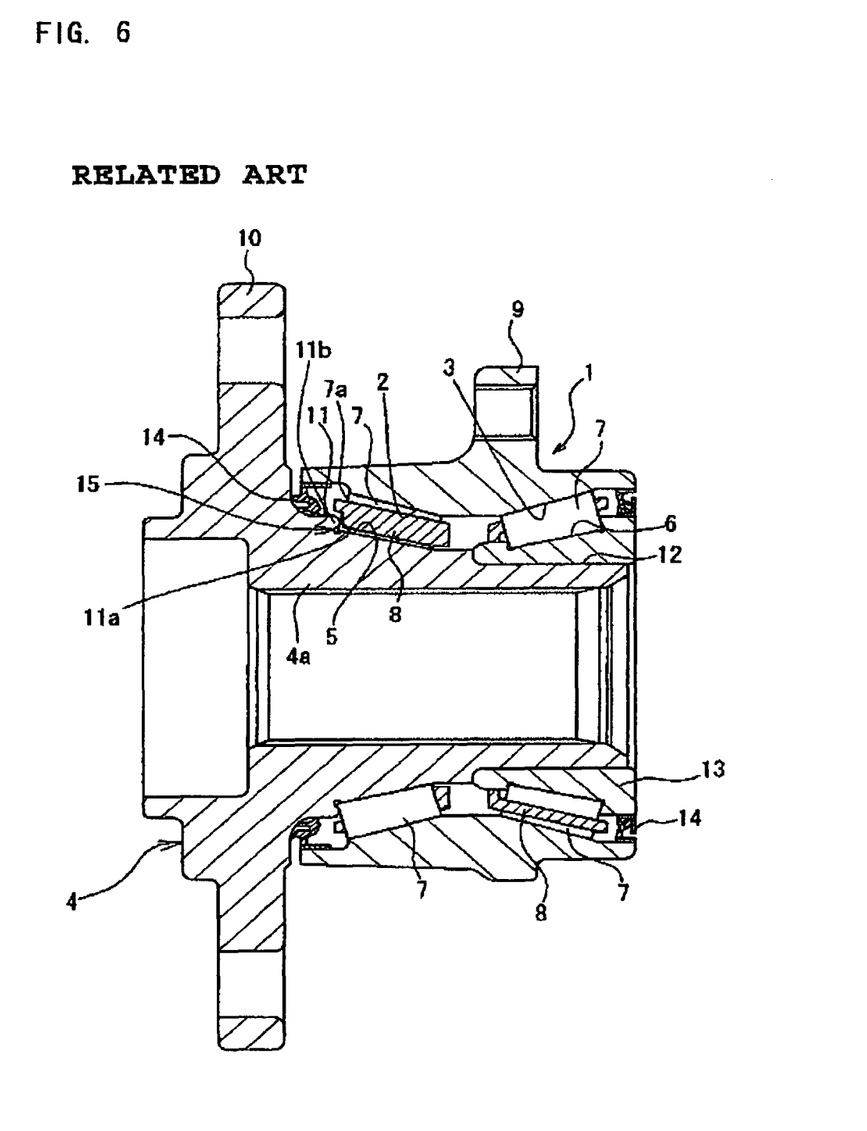
FIG. 6 is a sectional view illustrating a known tapered roller bearing apparatus.

As shown in FIG. 6, the tapered roller bearing apparatus includes first and second outer-ring raceways 2 and 3 which are provided in an inner circumferential surface of an outer ring 1; first and second inner-ring raceways 5 and 6 which are provided in an outer circumference of a hub main body 4 as an inner ring so as to be opposed to the outer-ring raceways 2 and 3; and a plurality of tapered rollers 7 which are arranged between the outer-ring raceways 2 and 3 and the inner-ring raceways 5 and 6 so as to be retained by a cage 8 at the same interval in the circumferential direction.

An attachment portion 9 is provided in the outer circumference of the outer ring 1 so as to fix the outer ring 1 to a suspension device (not shown).

Meanwhile, the hub main body 4 includes an inner shaft 4a and an inner ring member 13. At this time, a flange portion 10 to which a vehicle wheel-side member such as a rotor of a brake or a wheel is attached by a bolt (not shown) is provided in one end of the inner shaft 4a so as to outwardly extend in the diameter direction. On the other hand, a small-diameter cylindrical portion 12, to which the inner-ring member 13 having the second inner-ring raceway 6 formed in the outer circumference thereof is fitted, is provided in the other end of the inner shaft 4a. The first inner-ring raceway 5 is formed between the small-diameter cylindrical portion 12 and the flange portion 10 in the outer circumferential surface of the inner shaft 4a.

A large rib portion 11 having a guide surface 11a which comes into sliding contact with a large-diameter end surface 7a of the tapered roller 7 is formed in an end of the first inner-ring raceway 5 close to the flange portion 10. At this time, a clearance between the outer ring 1 and the inner shaft 4a is sealed by a seal member 14.

Incidentally, in the tapered roller bearing apparatus, in order to mainly ensure performance of the first inner-ring raceway 5, a high-frequency hardening is locally performed on a portion including the lower part of the flange portion 10, the large rib portion 11, the first inner-ring raceway 5, and the small-diameter cylindrical portion 12 to thereby form a surface-hardened layer thereon. Since an outer circumferential corner portion of the large rib portion 11, that is, a portion surrounded by an outer circumferential surface 11b and the guide surface 11a of the large rib portion 11 forms an acute edge, induction current is excessively concentrated on the edge portion during the high-frequency hardening to thereby become an overheat state. As a result, a problem arises in that a crack occurs in a portion around the large rib portion 11, that is, a relief portion 15 formed in the corner portion of the first inner-ring raceway 5 and the guide surface 11a of the large rib portion 11.

For this reason, a technique has been proposed in which the outer circumferential corner portion of the large rib portion 11 is set to an obtuse angle so as to prevent a crack by restricting an overheat state of the large rib portion 11 (see JP-A-2005-3111). According to the bearing apparatus disclosed in JP-A-2005-3111, since the outer circumferential corner portion of the large rib portion is set to an obtuse angle, volume of the outer circumferential portion of the large rib portion including the outer circumferential corner portion of the large rib portion becomes large to thereby increase a heat capacity. Accordingly, local overheat does not occur, thereby restricting or preventing a crack from occurring.

However, in the tapered roller bearing apparatus disclosed in JP-A-2005-3111, since the outer circumferential surface of the hub main body is simply formed into the inclined surface from the position around the lower part of the flange portion to the guide surface of the large rib portion in order to allow the outer circumferential corner portion of the large rib portion to be set to an obtuse angle, a problem may arise in that sealing performance of the seal member, which is disposed in the inclined surface while contacting therewith, deteriorates.

SUMMARY OF THE INVENTION

The present invention is made in consideration of the above-described problem, and an object of the invention is to provide a tapered roller bearing apparatus capable of preventing a crack occurring in the vicinity of a large rib portion while ensuring sealing performance of a seal member, and to provide a hub unit.

In order to achieve the above object, the present invention has the following arrangements.

(1) A tapered roller bearing apparatus comprising:
  an outer ring that includes an outer-ring raceway formed in an inner circumferential surface thereof;
  an inner ring which includes a large-diameter portion having a cylindrical portion with a substantially uniform outer diameter, a large rib portion having an outer circumferential surface and a guide surface continued to the outer circumferential surface, an inner-ring raceway, and a small-diameter cylindrical portion which are sequentially formed from one end to the other end, and are subjected to a heat treatment to have a surface-hardened layer; and
  a plurality of tapered rollers which are rollably disposed between the inner-ring raceway and the outer-ring raceway, a large-diameter end surface of the tapered roller being guided by the guide surface,
  wherein an angle formed between the guide surface and the outer circumferential surface is obtuse.

(2) The tapered roller bearing apparatus according to (1) further comprising a cage for retaining the tapered rollers, wherein a concave escaping portion is formed in the outer circumferential surface of the large rib portion so as to avoid interference of the cage.

(3) The tapered roller bearing apparatus according to (1), wherein an angle α formed between a line parallel to an axis and the outer circumferential surface of the large rib portion is in a range of $45°<\alpha<90°$.

(4) The tapered roller bearing apparatus according to (1) further comprising a seal member which is fixed to the outer ring and is brought into close contact with the cylindrical portion.

(5) A tapered roller bearing apparatus comprising:
  an outer ring that includes first and second outer-ring raceways formed in an inner circumferential surface thereof;
  an inner shaft that includes a large-diameter portion having a cylindrical portion with a substantially uniform outer diameter, a large rib portion having an outer circumferential surface and a guide surface continued to the outer circumferential surface, a first inner-ring raceway opposed to the first outer-ring raceways, and a small-diameter cylindrical portion which are sequentially formed from one end to the other end, and are subjected to a heat treatment to have a surface-hardened layer;

an inner ring that is fitted and fixed to the small-diameter cylindrical portion and includes a second inner-ring raceway that is formed on an outer circumferential surface thereof and is opposed to the second double row outer-ring raceway;

a plurality of tapered rollers which are rollably disposed between the first inner-ring raceway and the first outer-ring raceway and between the second inner-ring raceway and the second outer-ring raceway, a large-diameter end surface of the tapered roller disposed between the first inner-ring raceway and the first outer-ring raceway being guided by the guide surface, wherein an angle formed between the guide surface and the outer circumferential surface is obtuse.

(6) The tapered roller bearing apparatus according to (5) further comprising a cage for retaining the tapered rollers, wherein a concave escaping portion is formed in the outer circumferential surface of the large rib portion so as to avoid interference of the cage.

(7) The tapered roller bearing apparatus according to (5), wherein an angle $\alpha$ formed between a line parallel to an axis and the outer circumferential surface of the large rib portion is in a range of $45°<\alpha<90°$.

(8) The tapered roller bearing apparatus according to (5) further comprising a seal member which is fixed to the outer ring and is brought into close contact with the cylindrical portion.

(9) A hub unit comprising:

an outer ring that includes first and second outer-ring raceways formed in an inner circumferential surface thereof and an attachment portion for fixing a suspension device;

an inner shaft that includes a large-diameter portion having a cylindrical portion with a substantially uniform outer diameter, a large rib portion having an outer circumferential surface and a guide surface continued to the outer circumferential surface, a first inner-ring raceway opposed to the first outer-ring raceways, and a small-diameter cylindrical portion which are sequentially formed from one end to the other end, and are subjected to a heat treatment to have a surface-hardened layer;

an inner ring that is fitted and fixed to the small-diameter cylindrical portion and includes a second inner-ring raceway that is formed on an outer circumferential surface thereof and is opposed to the second double row outer-ring raceway;

a plurality of tapered rollers which are rollably disposed between the first inner-ring raceway and the first outer-ring raceway and between the second inner-ring raceway and the second outer-ring raceway, a large-diameter end surface of the tapered roller disposed between the first inner-ring raceway and the first outer-ring raceway being guided by the guide surface; and a flange portion for attaching a vehicle wheel-side member, which is provided in the inner shaft so as to outwardly extend in a diameter direction and be continued to the large-diameter portion, wherein an angle formed between the guide surface and the outer circumferential surface is obtuse.

(10) The hub unit according to (9) further comprising a cage for retaining the tapered rollers, wherein a concave escaping portion is formed in the outer circumferential surface of the large rib portion so as to avoid interference of the cage.

(11) The hub unit apparatus according to (9), wherein an angle $\alpha$ formed between a line parallel to an axis and the outer circumferential surface of the large rib portion is in a range of $45°<\alpha<90°$.

(12) The hub unit according to (9) further comprising a seal member which is fixed to the outer ring and is brought into close contact with the cylindrical portion.

In the tapered roller bearing apparatus according to the invention, since the large-diameter portion of the inner ring is provided with the cylindrical portion having the substantially uniform outer diameter, it is possible to surely allow the front end of a seal member disposed in the large-diameter portion to come into contact with the outer circumferential surface of the large-diameter portion, thereby ensuring sealing performance of the seal member.

The concave escaping portion may be formed in the outer circumferential surface of the large rib portion so as to avoid interference of the cage for retaining the tapered roller. With such a configuration, since the concave escaping portion is formed in the outer circumferential surface of the large rib portion, it is possible to prevent the cage from coming into contact with the large rib portion even when the cage moves. Accordingly, it is possible to prevent the cage from being broken or abraded.

An angle $\alpha$ formed between a line parallel to an axis and the outer circumferential surface of the large rib portion may be in a range of $45°<\alpha<90°$. In this case, it is possible to make an obtuse angle of the outer circumferential corner portion of the large rib portion sufficiently large, and thus it is possible to surely prevent a crack occurring in the large rib portion by restricting overheat thereof.

According to the tapered roller bearing apparatus of the invention, it is possible to prevent a crack occurring in the vicinity of a large rib portion while ensuring sealing performance of a seal member.

DETAILED DESCRIPTION OF PREFERRED EMBODIMENTS

Hereinafter, a tapered roller bearing apparatus according to exemplary embodiments of the invention will be described with reference to the accompanying drawings.

Figure 1:
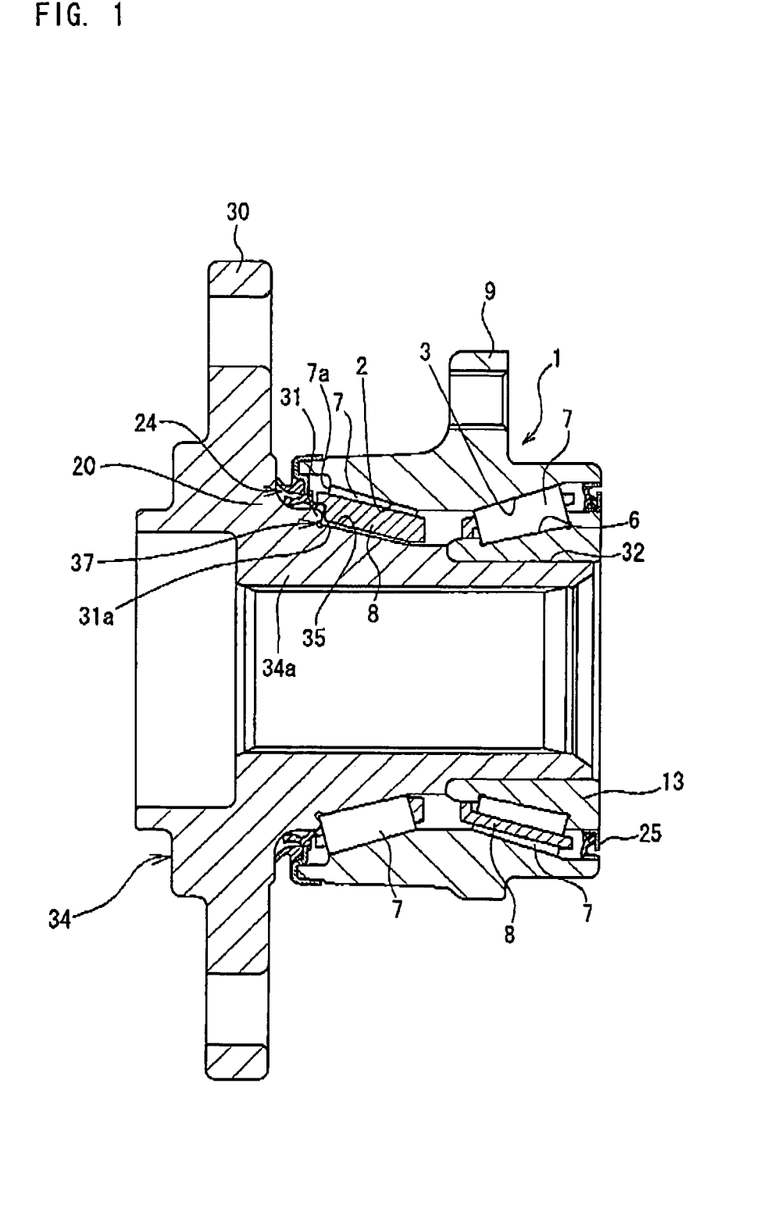
FIG. 1 is a sectional view illustrating a tapered roller bearing apparatus according to an embodiment of the invention.

FIG. 1 is a sectional view illustrating a tapered roller bearing apparatus according to an embodiment of the invention. The same reference numerals are given to the same components or members in that the tapered roller bearing apparatus has the same configuration as that of the known tapered roller bearing apparatus shown in FIG. 6 except for the configuration in the vicinity of a large rib portion and a seal member. As shown in FIG. 1, the tapered roller bearing apparatus according to this embodiment includes first and second outer-ring raceways 2 and 3 which are disposed in the inner circumferential surface of the outer ring 1; first and second inner-ring raceways 35 and 6 which are disposed in the outer circumference of a hub main body 34 as an inner ring so as to be opposed to the first and second outer-ring raceways 2 and 3; and a plurality of tapered rollers 7 which are rollably disposed between the first and second outer-ring raceways 2 and 3 and the first and second inner-ring raceways 35 and 6 while being arranged at the same interval in the circumferential direction by use of a cage 8.

An attachment portion 9 is provided in the outer circumference of the outer ring 1 so as to fix the outer ring 1 to a suspension device (not shown).

Meanwhile, the hub main body 34 includes an inner shaft 34a and an inner ring member 13. At this time, a flange portion 30 to which a vehicle wheel-side member such as a rotor of a brake or a wheel is attached by a bolt (not shown) is provided in one end of the inner shaft 34a so as to outwardly extend in the diameter direction. On the other hand, a small-diameter cylindrical portion 12, to which the inner-ring member 13 having the second inner-ring raceway 6 formed in the outer circumference thereof is fitted, is provided in the other end of the inner shaft 34a. In addition, the first inner-ring raceway 35 is formed between the small-diameter cylindrical portion 12 and the flange portion 30 in the outer circumferential surface of the inner shaft 34a.

A large rib portion 31 having a guide surface 31a which comes into sliding contact with a large-diameter end surface 7a of the tapered roller 7 is formed in an end of the first inner-ring raceway 35 close to the flange portion 30. A large-diameter portion 20 is formed between the large rib portion 31 and the flange portion 30. A relief portion 37 is formed in a corner between the guide surface 31a and the first inner-ring raceway 35.

At this time, a clearance between the outer ring 1 and the inner shaft 34a is sealed by a seal member 24. A clearance between the outer ring 1 and the inner ring member 13 is sealed by a seal member 25.

A high-frequency hardening is locally performed on a portion including the lower part of the flange portion 30, the large rib portion 31, the first inner-ring raceway 35, and the small-diameter cylindrical portion 12 to thereby form a surface-hardened layer thereon.

Figure 2:
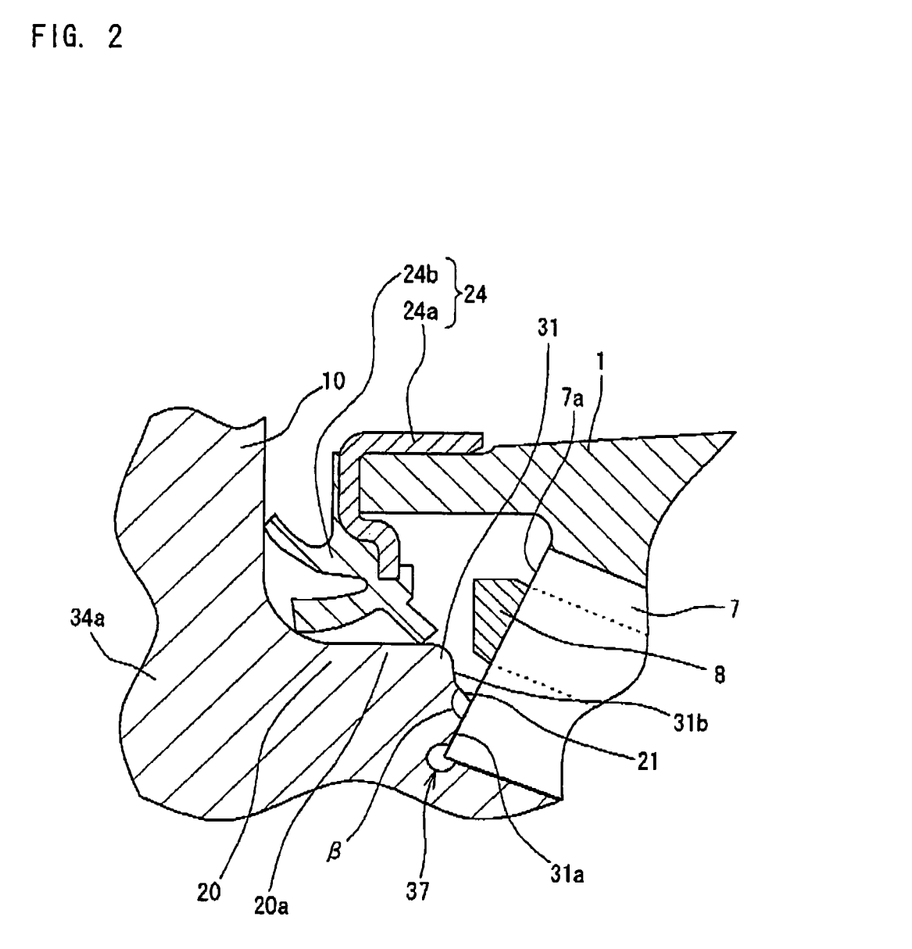
FIG. 2 is an enlarged view illustrating a main part of the tapered roller bearing apparatus shown in FIG. 1.

As specifically shown in FIG. 2, the invention is characterized in that an angle β formed between the guide surface 31a and an outer circumferential surface 31b of the large-rib portion 31 continued to the guide surface 31a of the large rib portion 31 is an obtuse angle, and the large diameter portion 20 includes a cylindrical portion 20a having the substantially uniform outer diameter. Since the outer circumferential corner portion of the large rib portion 31 is formed in an obtuse angle, volume of the outer circumferential portion of the large diameter portion including the outer circumferential corner portion of the large rib portion 31 becomes large to thereby increase a heat capacity. Accordingly, local overheat does not occur, thereby restricting or preventing a crack from occurring as described above. However, in this case, the outer circumferential surface 31b is not simply formed into an inclined surface up to a position in the vicinity of the lower part of the flange portion 30, but the cylindrical portion 20a having the substantially uniform outer diameter is formed in the large-diameter portion 20. As a result, it is possible to ensure a space formed between the outer ring 1 and the hub main body (inner ring) 34 so that a dimension in the diameter direction is substantially uniform. Therefore, it is possible to surely allow the front end of the seal member 24 disposed in the large-diameter portion 20 to come into contact with the outer circumferential surface of the large-diameter portion 20, thereby ensuring sealing performance of the seal member 24.

In the embodiment shown in FIG. 2, the seal member 24 includes a ring-like base portion 24a which is made of metal and a ring-like seal portion 24b which is made of rubber and fixed to the base portion 24a. At this time, the base portion 24a is press-fitted to the end circumferential surface of the outer ring 1 close to the flange portion 30 so that the front end of the seal member 24b is brought into close contact with the outer circumferential surface of the large-diameter portion 20. In addition, a concave stepped portion 21 as an escaping portion is formed in the outer circumferential surface 31h of the large-diameter portion 31 so as to avoid interference of the cage 8. Since the stepped portion 21 is provided in the state where the cage 8 retains the tapered roller 7 within a slight allowance, it is possible to prevent the cage 8 from coming into contact with the large rib portion 31 even when the cage 8 moves. Accordingly, it is possible to prevent the cage 8 from being broken or abraded.

Figure 3:
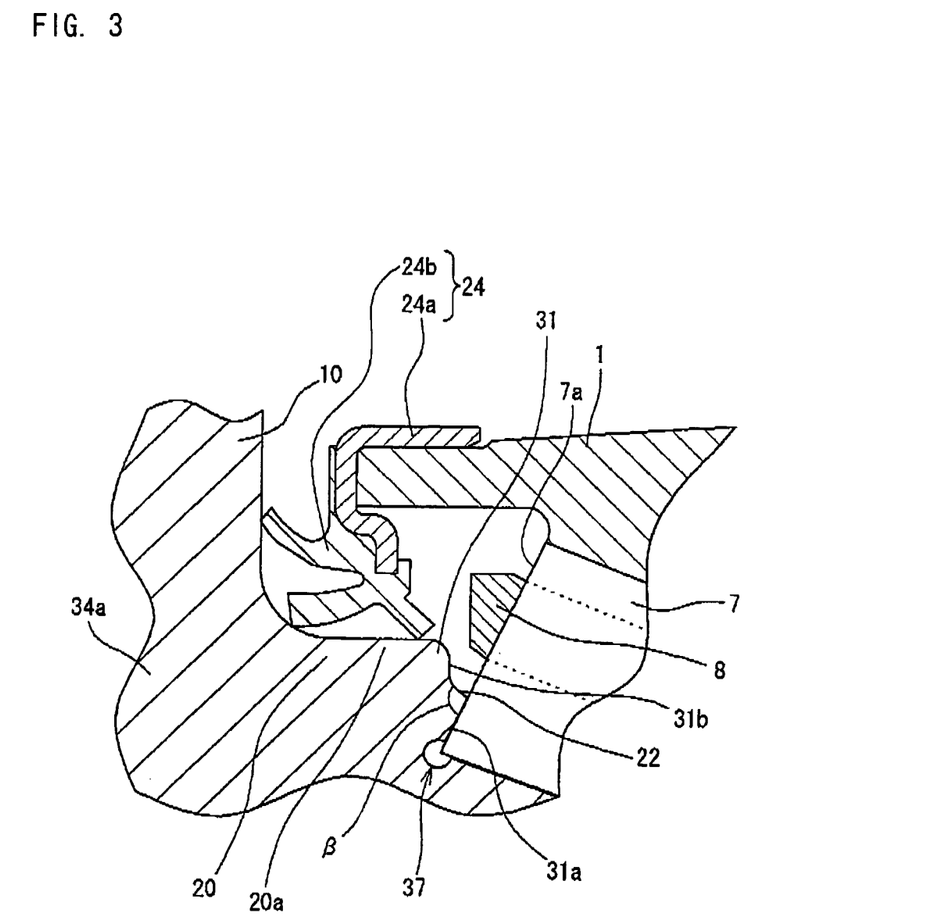
FIG. 3 is an enlarged view illustrating a main part of the tapered roller bearing apparatus according to another embodiment of the invention.

FIG. 3 is an enlarged view illustrating a main part of the tapered roller bearing apparatus according to another embodiment of the invention. In this embodiment, a curved portion 22 as an escaping portion is formed instead of the concave stepped portion 21 shown in FIG. 2 in order to avoid interference of the cage 8. In this case, it is possible to prevent the cage 8 from coming into contact with the large rib portion 31 even when the cage 8 moves. With such a configuration, it is possible to prevent the cage 8 from being broken or abraded. Alternatively, the curved portion 22 may be formed into a single curve portion or may be formed into a plurality of curve portions having curvature different from each other.

Figure 4:
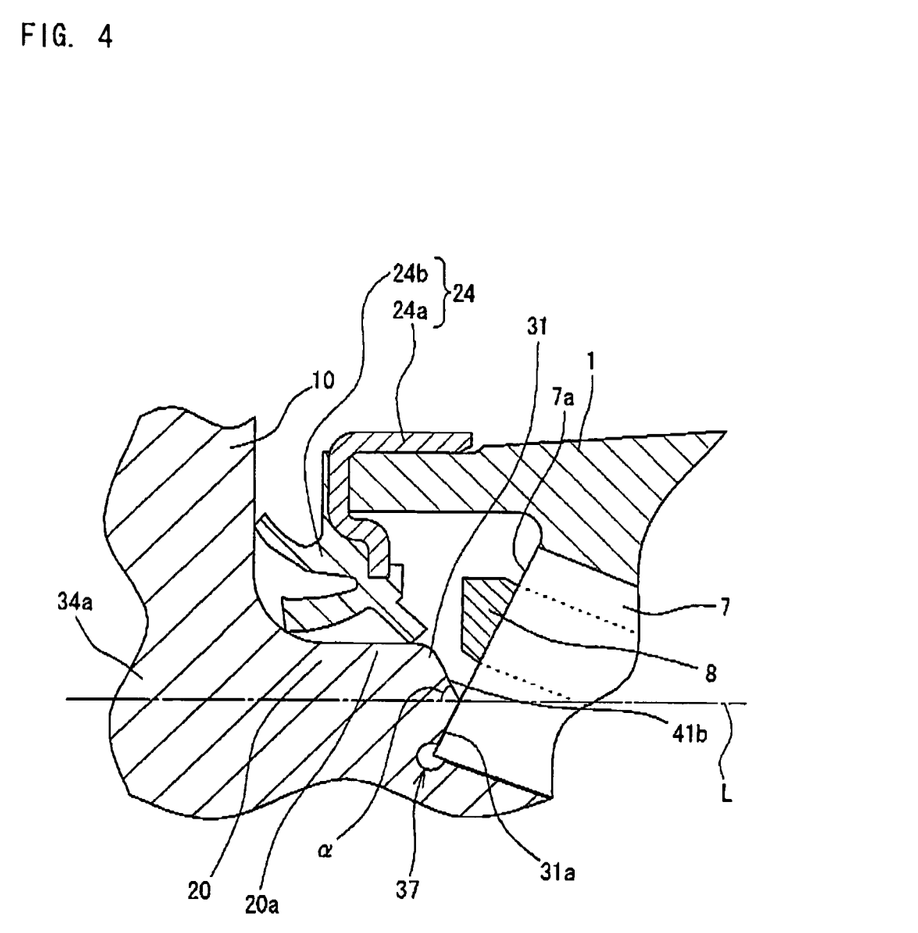
FIG. 4 is an enlarged view illustrating a main part of the tapered roller bearing apparatus according to still another embodiment of the invention.

FIG. 4 is an enlarged view illustrating a main part of the tapered roller bearing apparatus according to still another embodiment of the invention. In this embodiment, unlike the embodiments shown in FIGS. 2 and 3, an outer circumferential surface 41b of the large rib portion 31 is not formed in a concave shape, but is formed into a flat inclined surface. In this case, an angle α formed between the line L parallel to an axis of the bearing and the outer circumferential surface 41b of the large rib portion 31 may be set in the range of $45°<\alpha<90°$, but is desirable in the range of $45°<\alpha<60°$ in order to avoid interference of the cage 8.

Figure 5:
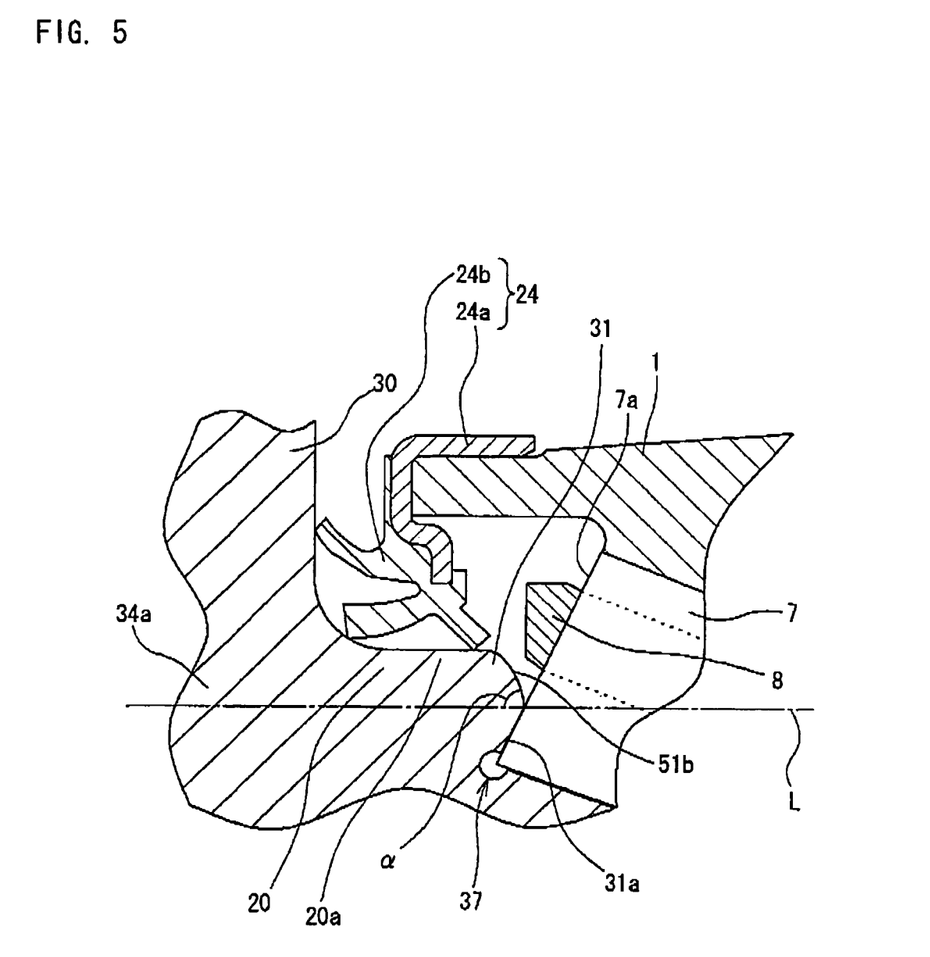
FIG. 5 is an enlarged view illustrating a main part of the tapered roller bearing apparatus according to still another embodiment of the invention.

FIG. 5 is an enlarged view illustrating a main part of the tapered roller bearing apparatus according to still another embodiment of the invention. In this embodiment, unlike the embodiments shown in FIGS. 2 and 3, an outer circumferential surface 51b of the large rib portion 31 is not formed in a concave shape, but is formed in a convex shape so as to outwardly expand in the diameter direction. In this case, volume of an outer circumferential portion of the large rib portion including the outer circumferential corner portion of the large rib portion 31 becomes larger than that shown in FIGS. 2 to 4 to thereby further increase a heat capacity. Accordingly, it is possible to more surely prevent local overheat from occurring. In this embodiment, it is desirable to select degree how the outer circumferential corner portion of the large rib portion 31 is obtuse or how the outer circumferential surface thereof expands in consideration of the movement of the cage 8 in order to prevent interference of the cage 8.

What is claimed is:

1. A tapered roller bearing apparatus comprising:
   an outer ring that includes an outer-ring raceway formed in an inner circumferential surface thereof;

an inner ring which includes a large-diameter portion including a cylindrical portion with a substantially uniform outer diameter, a large rib portion including an outer circumferential surface and a guide surface continued to the outer circumferential surface, an inner-ring raceway, and a small-diameter cylindrical portion which are sequentially formed from one end to the other end, and are subjected to a heat treatment to have a surface-hardened layer;

a plurality of tapered rollers which are rollably disposed between the inner-ring raceway and the outer-ring raceway, a large-diameter end surface of the tapered roller being guided by the guide surface, wherein an angle formed between the guide surface and the outer circumferential surface is obtuse, and wherein an angle a formed between a line parallel to an, axis and the outer circumferential surface of the large rib portion is in a range of $45°<\alpha<90°$.

2. The tapered roller bearing apparatus according to claim 1, further comprising a cage for retaining the tapered rollers,
wherein a concave escaping portion is formed in the outer circumferential surface of the large rib portion so as to avoid interference of the cage.

3. The tapered roller bearing apparatus according to claim 1, further comprising a seal member which is fixed to the outer ring and is brought into close contact with the cylindrical portion.

4. A tapered roller bearing apparatus comprising:
an outer ring that includes first and second outer-ring raceways formed in an inner circumferential surface thereof;
an inner shaft that includes a large-diameter portion including a cylindrical portion with a substantially uniform outer diameter, a large rib portion including an outer circumferential surface and a guide surface continued to the outer circumferential surface, a first inner-ring raceway opposed to the first outer-ring raceways, and a small-diameter cylindrical portion which are sequentially formed from one end to the other end, and are subjected to a heat treatment to have a surface-hardened layer;
an inner ring that is fitted and fixed to the small-diameter cylindrical portion and includes a second inner-ring raceway that is formed on an outer circumferential surface thereof and is opposed to the second outer-ring raceway; and
a plurality of tapered rollers which are rollably disposed between the first inner-ring raceway and the first outer-ring raceway and between the second inner-ring raceway and the second outer-ring raceway, a large-diameter end surface of the tapered roller disposed between the first inner-ring raceway and the first outer-ring raceway being guided by the guide surface,
wherein an angle formed between the guide surface and the outer circumferential surface is obtuse, and
wherein an angle α formed between a line parallel to an axis and the outer circumferential surface of the large rib portion is in a range of $45°<\alpha<90°$.

5. The tapered roller bearing apparatus according to claim 4, further comprising a cage for retaining the tapered rollers,
wherein a concave escaping portion is formed in the outer circumferential surface of the large rib portion so as to avoid interference of the cage.

6. The tapered roller bearing apparatus according to claim 4, further comprising a seal member which is fixed to the outer ring and is brought into close contact with the cylindrical portion.

7. A hub unit comprising:
an outer ring that includes first and second outer-ring raceways formed in an inner circumferential surface thereof and an attachment portion for fixing a suspension device;
an inner shaft that includes a large-diameter portion including a cylindrical portion with a substantially uniform outer diameter, a large rib portion including an outer circumferential surface and a guide surface continued to the outer circumferential surface, a first inner-ring raceway opposed to the first outer-ring raceways, and a small-diameter cylindrical portion which are sequentially formed from one end to the other end, and are subjected to a heat treatment to have a surface-hardened layer;
an inner ring that is fitted and fixed to the small-diameter cylindrical portion and includes a second inner-ring raceway that is formed on an outer circumferential surface thereof and is opposed to the second outer-ring raceway;
a plurality of tapered rollers which are rollably disposed between, the first inner-ring raceway and the first outer-ring raceway and between the second inner-ring raceway and the second outer-ring raceway, a large-diameter end surface of the tapered roller disposed between the first inner-ring raceway and the first outer-ring raceway being guided by the guide surface; and
a flange portion for attaching a vehicle wheel-side member, which is provided in the inner shaft so as to outwardly extend in a diameter direction and be continued to the large-diameter portion,
wherein an angle formed between the guide surface and the outer circumferential surface is obtuse, and
wherein an angle α formed between a line parallel to an axis and the outer circumferential surface of the large rib portion is in a range of $45°<\alpha<90°$.

8. The hub unit according to claim 7, further comprising a cage for retaining the tapered rollers,
wherein a concave escaping portion is formed in the outer circumferential surface of the large rib portion so as to avoid interference of the cage.

9. The hub unit according to claim 7, further comprising a seal member which is fixed to the outer ring and is brought into close contact with the cylindrical portion.

* * * * *